June 17, 1969 MASATAKA SARUTANI 3,449,890
APPARATUS FOR PREPARING AND SEALING MIXED MEDICINES
Filed July 11, 1966

Masataka Sarutani,
INVENTOR.

BY Wenderoth, Lind
and Ponack
Attorneys

June 17, 1969 MASATAKA SARUTANI 3,449,890
APPARATUS FOR PREPARING AND SEALING MIXED MEDICINES
Filed July 11, 1966 Sheet 3 of 4
FIG. 5
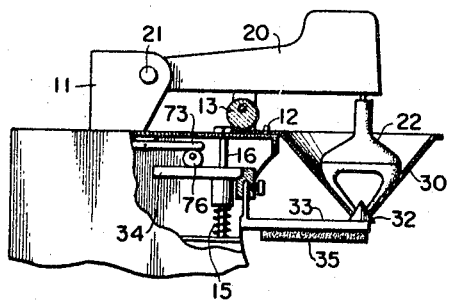
FIG. 6
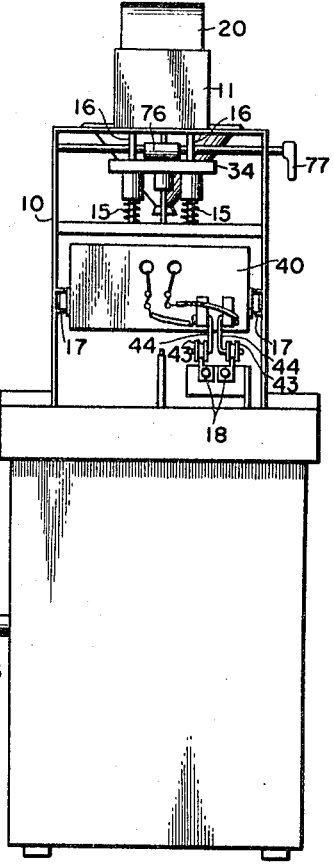
FIG. 7
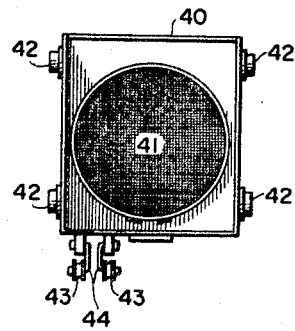
FIG. 9
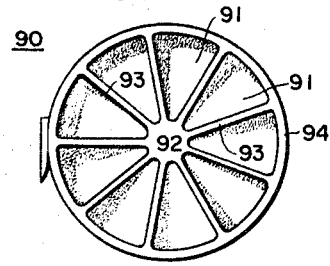
FIG. 10
Masataka Sarutani,
INVENTOR.
BY Wendeworth, Lind
and Ponack.
Attorneys United States Patent Office 3,449,890
Patented June 17, 1969

3,449,890
APPARATUS FOR PREPARING AND SEALING MIXED MEDICINES
Masataka Sarutani, 9–6 Nibancho, Chiyoda-ku, Tokyo, Japan
Filed July 11, 1966, Ser. No. 564,166
Claims priority, application Japan, Oct. 2, 1965, 40/60,152
Int. Cl. B65b 1/36, 7/28
U.S. Cl. 53—281       10 Claims

ABSTRACT OF THE DISCLOSURE

Apparatus for mechanically premixing a variety of medicinal ingredients and preparing them in homogenized form, including metering and packaging the pre-mixed ingredients into radial compartmentized, heat-sealed packages having a predetermined plurality of uniform dosages.

---

Figure 1:
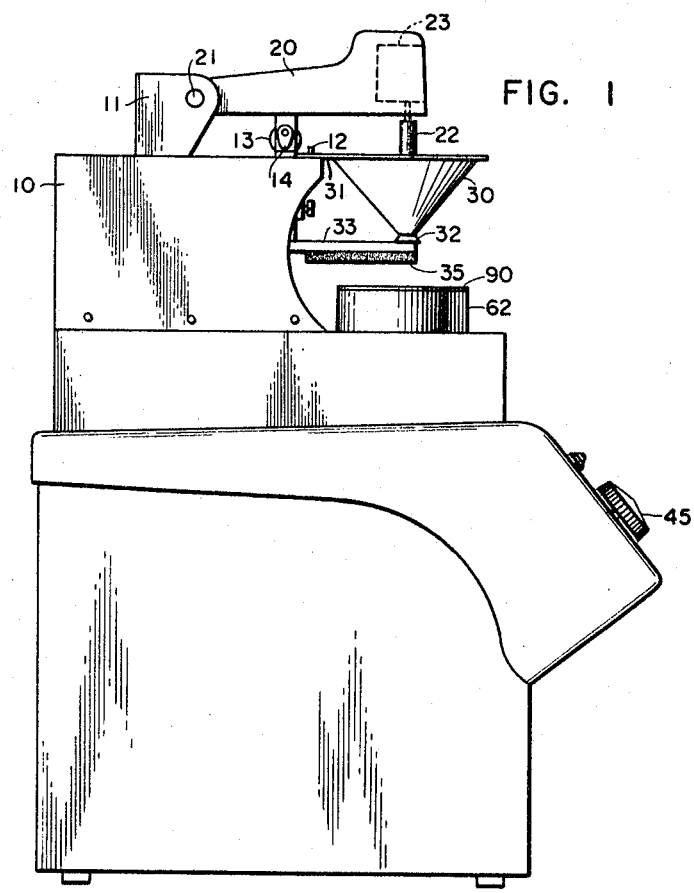

This invention relates to apparatus for mixing and homogenizing several kinds of medicines according to any prescription, then equally distributing them into a container and sealing up the container so that the medicines may be administered to patients in hospitals and dispensaries.

In the conventional manner of preparing and wrapping mixed medicines by using mostly a mortar, pestle, powder scoop and square wrapping paper:

(1) Though considerable time and labor are required to stir the medicines with the mortar and pestle, desirable uniform mixing is hard to attain.

(2) After the stirring, when the medicines are distributed on pieces of the wrapping paper by eye measurement by using the powder scoop, the quantitative equality will be low and, in such case as of handling violent poisons, a great influence might be incurred.

(3) When the medicines are to be wrapped by folding the square wrapping paper, not only time and trouble will be required but also all the medicines might leak out while being carried.

In order to overcome such defects, various apparatus have been already invented. However, such attempts have been adapted to pharmaceutical companies mass-producing the same preparations exclusively but have not been adapted to uses in hospitals and dispensaries preparing medicines according to respectively different prescriptions for many patients as intended by the present invention.

The first object of the present invention is to provide an apparatus for uniformly mixing required amounts of fixed kinds of medicines each time, then equally distributing the mixed medicines into as many divisions in a container as the doses of the medicines and sealing the container on the upper surface with a sealing sheet.

The second object of the present invention is to provide an apparatus wherein a vertical shaft for rotating the above mentioned container is made free to rise and fall so that the vertical shaft itself may automatically rotate or stop denpending on the height of the rise and at the same time a valve body in an opening in the lower part of a hopper may be opened or closed as operatively connected with the rise and fall of the vertical shaft.

The third object of the present invention is to provide an apparatus wherein an electric heating plate device is provided to apply by heat-bonding a sealing sheet onto the upper surface of a container into which mixed medicines have been equally distributed so that, when said device is to be used, it may be pulled out and the vertical shaft may be elevated to be pressed against the surface of the sealing sheet and that, when said heating plate device is not to be used, it may be retracted into the inner part so as not to be in the way.

The fourth object of the present invention is to provide an apparatus wherein a sweeping plate, which will sweep away any medicines deposited on the surface to be sealed before a container is sealed on the upper surface by heat-bonding with a sealing sheet, is provided in the lower part of a valve body so that the container may be positively sealed.

The fifth object of the present invention is to provide an apparatus wherein a stirring hopper in which medicines are apt to be deposited can be easily removed so that the hopper and the valve body may be simply well cleaned.

Detailed explanations shall be made in the following with reference to the accompanying drawings to make it easier to understand the present invention and its objects and features. In the drawings, similar parts are represented by the same corresponding reference numerals.

Figure 2:
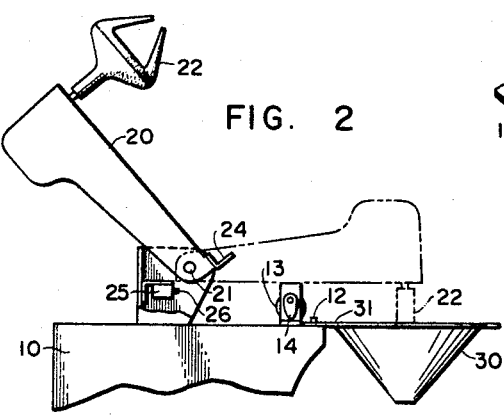
Figure 3:
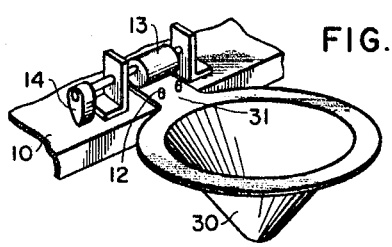
Figure 4:
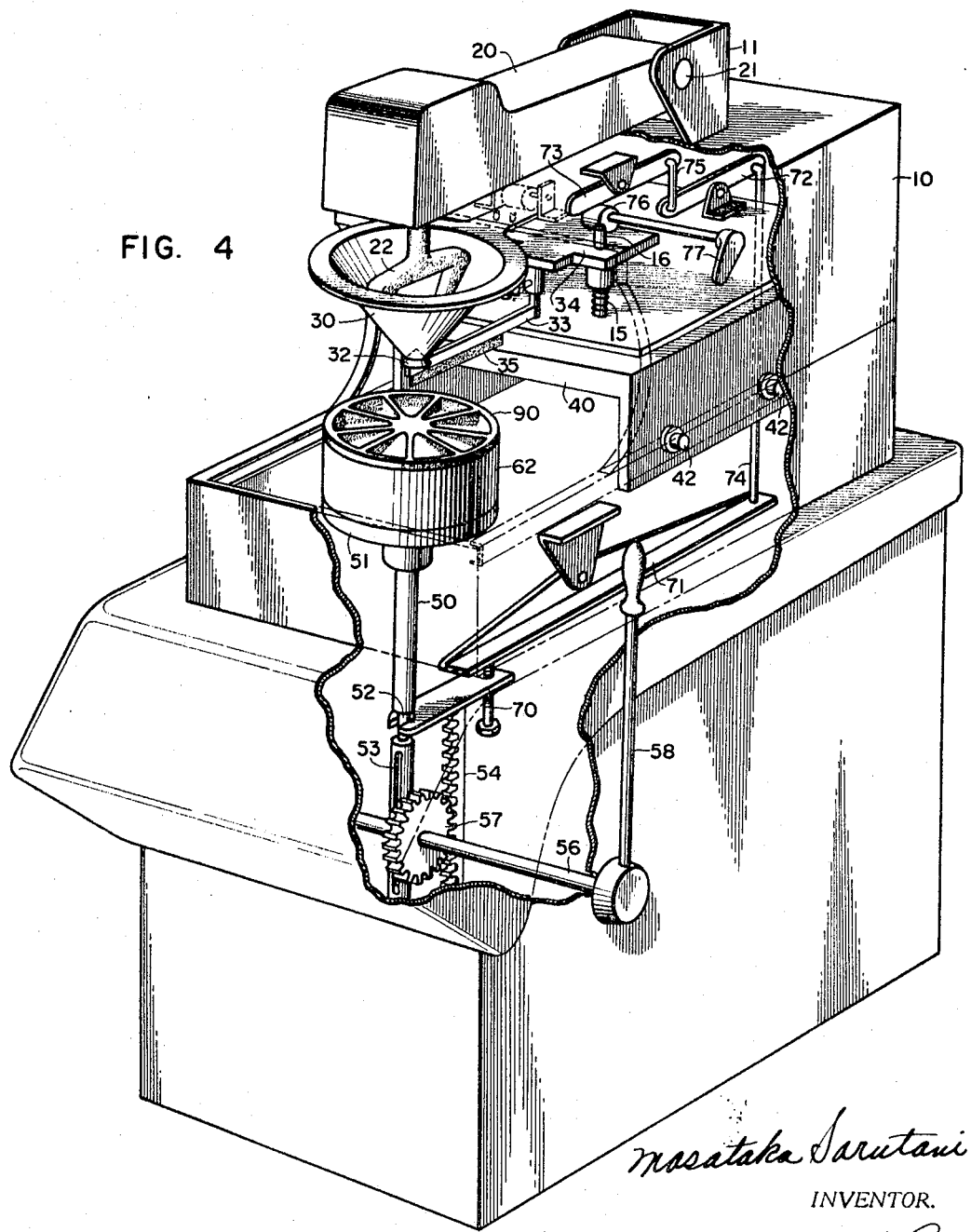
Figure 8:
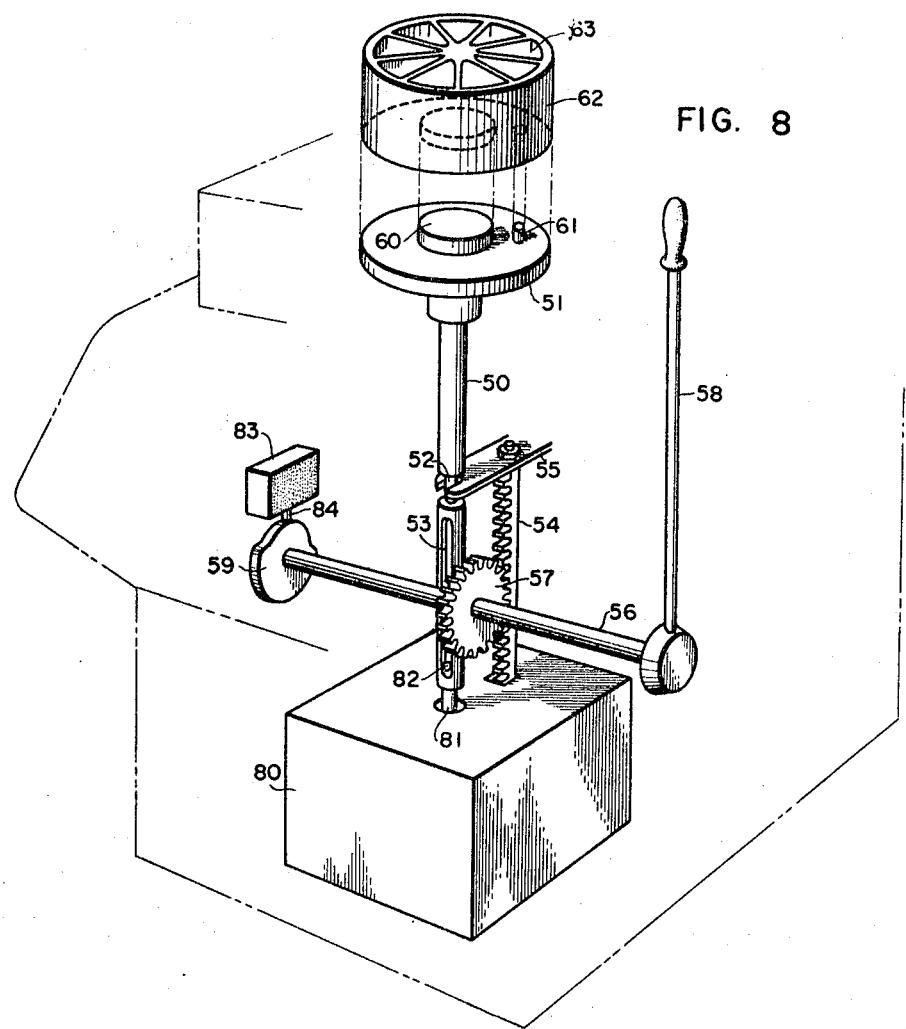

In the drawings:

FIG. 1 is a general side view of an apparatus according to the present invention;
FIG. 2 is a partial side view of a stirring blade device;
FIG. 3 is a perspective view of a hopper fitting device;
FIG. 4 is a perspective view of an opening and closing mechanism for a valve body provided in an opening in the lower part of the hopper;
FIG. 5 is a partial side view of a part near the valve body as sectioned;
FIG. 6 is a general back view of the apparatus according to the present invention;
FIG. 7 is a plan view of a heating plate as seen from the rear;
FIG. 8 is a perspective view for explaining a vertical shaft driving mechanism for elevating, lowering, rotating and stopping a vertical shaft;
FIGS. 9 and 10, are respectively, a plan view and a vertical cross-section view of a dividing and sealing container to be used in the apparatus of the present invention.

An embodiment of an apparatus for preparing and sealing mixed medicines according to the present invention shall be explained. This apparatus fundamentally comprises a hopper and stirring blade device wherein several kinds of medicines are to be put and uniformly mixed, a hopper fitting device to make said hopper freely attachable to and removable from a frame, a valve device in an opening in the lower part of the hopper, a sweeping plate to sweep the upper surface of a container fitted below the valve body, an electric heating plate device which can be moved to and fro as positioned below said sweeping plate, a vertical shaft device to fix the container and to elevate, lower, rotate and stop it and a device for opening and closing said valve device as operatively connected with the rise and fall of the vertical shaft.

A container for dividing and sealing medicines which is very adaptable to be used in the apparatus according to the present invention is illustrated in FIGS. 9 and 10. This container is formed preferably of a thermoplastic synthetic resin so that medicine charging parts 91 of a concave cross-section may be radially arranged from a central flat part 92 and may be defined with dividing surface parts 93 and an annular flange surface part 94 which are in the same plane as of the central flat part 92. The number of the medicine charging parts 91 may be optionally selected to be, for example, six (for 2 days), nine (for 3 days) or 21 (for 1 week). Nine divisions are illustrated. It is one of the fundamental principles of the apparatus of the present invention that, when mixed medicines are made to flow down from above and into said container 90 while it is being rotated, the medicines will be quickly equally divided into the respective charging parts 91.

First of all, the hopper and stirring blade device provided on the uppermost step in the apparatus of the present invention shall be explained.

As evident from FIGS. 1 and 2, a box-shaped cantilever 20 rotatable through a pivot 21 is fitted to a supporting frame 11 secured to the upper surface of a machine body 10 and is provided at the other end with paddle-shaped stirring blades 22 made of a hard synthetic resin. These stirring blades 22 are connected with a reduced-speed motor 23 fitted within the cantilever. When the cantilever is horizontally positioned as shown by the chain line in FIG. 2, an L-shaped plate 24 fixed to the end of the cantilever will push a push button 26 for operating a microswitch so that the motor 23 may be driven to rotate the stirring blades. When the cantilever 20 is inverted at the edge of the upper end of the supporting frame 11 as shown by the solid line in FIG. 2, the L-shaped plate 24 will no longer push the push button 26 of the microswitch and the stirring blades 22 will stop. That is to say, depending on the angle of the cantilever 20, the stirring blades 22 will automatically rotate or stop. When the cantilever is horizontal as in FIG. 1, the stirring blades 22 will rotate as positioned correctly in the hopper 30. The hopper 30 is inverted truncated conical and is made usually of stainless steel.

In FIG. 3 is shown a device for attaching the hopper 30 to the frame 10. Two pins 12 are set on the upper surface of the frame 10 so as to just fit in holes made in a tongue-shaped piece 31 connected with the upper edge of the hopper 30. The end part of the tongue-shaped piece 31 is to be pressed by the surface of an eccentric roll 13 fitted to the upper surface of the frame 10. Reference numeral 14 is a handle to rotate the eccentric role 13. Now, when the cantilever 20 is inverted as shown by the solid line in FIG. 2 and the handle 14 is rotated to release the press by the eccentric roll 13, the hopper 30 will be able to be easily removed from the frame 10 or fitted in a correct state.

In FIGS. 4 and 5 is shown a valve body device provided in an opening in the lower part of the hopper 30. As is clear from these drawings, a conical valve body 32 is secured to an operating rod 33 fixed to an operating plate 34 operating so as to be normally pushed up by springs 15. Said operating plate 34 is movable up and down along two vertical guide bars 16. As the top part of the conical valve body 32 fits and closes the opening in the lower part of the hopper 30, even if measured medicines to be mixed are put into the hopper, they will not leak out through the opening in the lower part. A device for lowering the valve body 32 to allow the mixed medicines to flow down through the opening in the lower part of the hopper 30 shall be described later. The stirring blade 22 may be not only of the illustrated oar-shape but also of any other proper shape by which homogeneous mixing can be attained irrespective of the kind, granularity, specific gravity and weight of the medicines. 35 is a sweeping plate fixed to the lower part of the operating rod 33, is made of a soft cloth or synthetic resin film and is a little longer than the radius of a container 90.

In FIGS. 6 and 7 is shown an electric heating plate device for heat-bonding a sealing sheet on the upper surface of the container. An electric heating plate 41 is fitted to a mounting frame 40. Two rollers 42 are fitted to each side of the frame 40. Said rollers 42 are rotatable as fitted inside horizontal channel-shaped guide frames 17 secured as opposed to each other to the right and left inside surfaces of the machine frame body 10. Therefore, the frame 40 and electric heating plate 41 are horizontally movable so as to be used for the sealing operation when they are pulled out and to be retracted when they are not to be used. Two electroconductive rails 18 are electrically insulatively provided in parallel with each other in the machine body 10 and are connected with electric wires in the outer end parts. Two electroconductive grooved rollers 43, always resiliently in contact with rails 18, and their legs 44 are attached to the frame 40 and are electrically connected with the heater of the heating plate 41. The temperature of the heating plate 41 can be freely adjusted by rotating a knob 45 of a transformer.

In FIG. 8 is shown a device for elevating, lowering, rotating and stopping a vertical shaft. A vertical shaft 50 has a flange 51 secured to the upper end, and has a stepped part 52 formed substantially in the middle part. The shaft 50 is of hollow-tubular form in the lower half part and has vertical slots 53 made in said part. An engaging plate 55 fixed to the upper end part of a rack 54 is engaged with said stepped part. An output shaft 81 of a reduced-speed motor 80 for driving the vertical shaft is fitted in the hollow tubular part. A pin 82 to fit in the vertical slot 53 is fixed to said output shaft. A horizontal shaft 56 to which is fixed a pinion 57 meshing with the above mentioned rack 54 is rotatably borne in the machine body 10. A handle 58 is fixed to the part of said horizontal shaft 56 extending out of the machine body 10. When the handle 58 is pulled down or returned, the rack 54 meshing with the pinion 57 will rise or fall and the vertical shaft 50 and the flange 51 will rise or fall through the engaging plate 55, respectively. A cam plate 59 is fixed to the horizontal shaft 56 so that, with a certain angular rotation of the horizontal shaft 56, the cam surface may push a push button 84 of a microswitch 83 to drive the motor 80 and rotate the vertical shaft 50. A cylindrical projection 60 is provided to project in the central part and a pin 61 is set on the upper surface of the flange 51 so as to fix a receiving base 62 on the flange 51. Holes corresponding to them are made on the lower surface of the receiving base 62. Radial convex grooves 63 in which the respective charging parts 91 of a container 90 are to fit are made on the upper surface of the receiving base 62.

In FIG. 4 a device is shown whereby the valve body 32 is to open and close the opening in the lower part of the hopper and is operatively connected with the rise and fall of said vertical shaft 50. With the rise of the vertical shaft 50, the operating plate 34 will be pushed down against the forces of the compression springs 15 through an adjusting screw 70 screwed to the engaging plate 55, three levers 71, 72 and 73 connected respectively through connecting rods 74 and 75 and an eccentric roll 76 provided rotatably on the operating plate 34 and thereby the valve body 32 will lower to be opened. On the other hand, when the vertical shaft 50 lowers, due to the forces of the compression springs 15, the operating plate 34 and valve body 32 will rise and the valve will be closed. In such case, the valve opening time can be adjusted with the adjusting screw 70 and the valve opening degree can be adjusted with the eccentricity of the eccentric roll 76 with a handle 77.

The manner of operation is believed to be clearly apparent in the foregoing, but will be reviewed as follows: First of all, if the measured medicines to be mixed are put into the hopper 30 and the cantilever 20 is made horizontal, the stirring blades 22 will begin to rotate and the mixing of the medicines will proceed. On the other hand, the container 90 having as many charging parts 91 as the doses is fitted in the concave grooves 63 in the receiving base 62 fixed on the flange 51 of the vertical shaft 50. When the medicines have been well mixed, the handle 58 is pulled down so that the pinion 57 may be rotated and the vertical shaft may be elevated through the rack 54 and engaging plate 55. When the container 90 has come near the sweeping plate 35 with the rise of the vertical shaft, the cam plate 59 will operate the microswitch 83, the motor 80 for driving the vertical shaft 50 will begin to rotate and the rotation of the vertical shaft 50, receiving base 62 and container 90 will begin. On the other hand, as it is operatively connected with the rise of the vertical shaft, the operative plate 34 will be lowered against the forces of the compression springs 15 through link devices 70 to 76 and the valve body 32 will be opened. Thus, the mixed medicines in the hopper 30 will flow down through the opening in the lower part of the hopper and will be equally distributed into the respective charging parts 91 of the rotating container 90.

As all the medicines in the hopper will flow out within a short time, the vertical shaft 50, is then elevated again until the upper surface of the container 90 comes into sliding contact with the sweeping plate 35 and the medicines deposited on the upper surface of the container are swept down into the charging parts 91. Then the handle 58 is once returned to the original state so that the vertical shaft 50 may fall. In such case, due to the action of the cam plate 59, the rotating of the vertical shaft will stop again. A sealing sheet (not illustrated) is mounted on the upper surface of the container 90, the frame 40 of the heating plate 41 is pulled out and the handle 58 is again pulled down so that the surface of the sealing seat may be pressed against the heated heating plate 41 for a short time. In such case, the cam plate 59 will not rotate to the position of pushing the push button 84 of the microswitch 83 and therefore the vertical shaft 50 and container 90 will not rotate. When handle 58 is returned to the original state, there will have been made a sealed container in which the medicines are equally divided. Further, a knife-shaped part on the outer periphery of the container torn off and the sealing sheet is pierced with it in administering the dose so that the sealing sheet on the adjacent charging part may not be broken by mistake.

The scope of the claim of the right on the present invention is as follows.

What is claimed is:
1. Apparatus for mixing and packaging prepared medicinal ingredients comprising in combination:
 (a) a machine frame;
 (b) a combined mixing and dispensing hopper mounted on said frame and having a dispensing aperture in the lower end thereof;
 (c) stirring means including rotatable stirring arms positionable within said hopper, and drive means for rotating same;
 (d) vertically shiftable valve means normally biased closed and in operable association with said hopper dispensing aperture;
 (e) rotatable mix-receiving means mounted in said frame including:
  (1) a vertically disposed, vertically shiftable, output shaft terminating in an upper end spaced substantially below and coaxially with said dispensing aperture of the hopper;
  (2) means for rotatably driving said shaft;
  (3) means for raising and lowering said shaft; and
  (4) composite mix-receiving matrix means attached to the upper end of said output shaft in normally spaced relation beneath said hopper;
 (f) lever means operably interconnecting said output shaft and said valve means to selectively open and close said valve device responsive to predetermined operation of the means for respectively raising and lowering said output shaft, said latter means interconnected with the lever means; and
 (g) package heat-sealing means including a preformed, compartmentized, package receptacle supported by said matrix and adapted to have a heat sealable membrane overlaid thereon subsequent to the mix being dispensed in the receptacle, and including means enabling it to be reciprocably mounted on the frame for selective heat-sealing disposition adjacently above the matrix-supported receptacle with overlaid membrane.

2. Apparatus as defined in claim 1, further including a mix-sweeping plate means on the lower part of said valve means of paragraph (d), and adaptable to sweep deposited mix from the upper surfaces of the packaging receptacle responsive to rotation thereof when in its raised position closely adjacent said sweeping plate means.

3. Apparatus as defined in claim 1, wherein the mix-receiving matrix means of paragraph (e)(4) is removably mounted and includes:
 (1) a receiving-base mounting flange affixed to the upper end of said output shaft;
 (2) selectively mountable, generally cylindrical, compartmentized mix-receiving base members having different predetermined pluralities of uniform compartments, and removably mountable on said mounting flange for rotation therewith; and
 (3) a said preformed packaging receptacle having complementally formed compartment recesses therein corresponding in number to the number of compartments of a given base member.

4. Apparatus as defined in claim 1 wherein the stirring means includes a cantilever pivotally mounted on said frame, said stirring arms rotatably carried at the outer end of said cantilever, and the drive means of paragraph (e) for driving the stirring means includes an electrical circuit including a power source in said cantilever, and means associated with said hopper and said cantilever to automatically energize said circuit responsive to positioning the stirring arms within said hopper.

5. Apparatus as defined in claim 1 wherein the drive means of paragraph (e)(2) include an electrical circuit including a separate power source, and means to automatically energize said circuit responsive to the simultaneous operation of the lower means to effect raising of said output shaft.

6. Apparatus as defined in claim 1 wherein the lever means of paragraph (f) include a plurality of interconnected first-class levers and adjustment means therefor; and spring-biased lever means connected with said valve means to normally hold the valve in closed condition and against which the levers must act to open said valve.

7. Apparatus as defined in claim 1 wherein the valve means includes a generally horizontally disposed arm operably supported from the frame at one end and a valve member on the other end for sealing the aperture in said hopper; and the sweeping plate means (of claim 3) includes a sweep arm dependingly mounted on said valve arm and generally coextensive therewith.

8. Apparatus as defined in claim 1 wherein the hopper is removably mounted for use of selective hoppers, means for removably mounting said hoppers include a pair of orienting and mounting pins on said frame; each hopper including a laterally extended mounting tongue piece having spaced apertures therein for complemental press-fit with said pins; and eccentric cam roller means operable against said tongue piece to firmly secure it upon the pins to the frame.

9. Apparatus as defined in claim 1 wherein the means of paragraph (e)(3) for raising and lowering said output shaft include intermeshing rack and pinion means, with said rack disposed generally parallel to and interconnected with said output shaft; said pinion means including a pinion gear mounted on a shaft, said shaft disposed horizontally in the frame and having an operating handle at one end.

10. Apparatus as defined in claim 9 further including on the other end of said horizontally disposed shaft a cam plate operably engaged with the circuit means of claim 6 to effect energization thereof responsive to predetermined rotating of the handle in a given direction.

References Cited

UNITED STATES PATENTS

| 1,521,928 | 1/1925 | Campbell | 53—281X |
| 1,909,003 | 5/1933 | Orear et al. | 141—276 |
| 3,137,111 | 6/1964 | Bostrom | 53—373 |

THERON E. CONDON, *Primary Examiner.*

R. L. SPRUILL, *Assistant Examiner.*

U.S. Cl. X.R.

141—276, 129; 53—373